(12) United States Patent  (10) Patent No.: US 8,422,780 B2
Ciuc et al.  (45) Date of Patent: *Apr. 16, 2013

(54) METHOD AND APPARATUS OF CORRECTING HYBRID FLASH ARTIFACTS IN DIGITAL IMAGES

(75) Inventors: Mihai Ciuc, Bucharest (RO); Adrian Capata, Bucharest (RO); Florin Nanu, Bucharest (RO); Eran Steinberg, San Francisco, CA (US); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/357,548

(22) Filed: Jan. 24, 2012

(65) Prior Publication Data

US 2012/0120274 A1    May 17, 2012

Related U.S. Application Data

(63) Continuation of application No. 12/960,487, filed on Dec. 4, 2010, now Pat. No. 8,126,265, which is a continuation of application No. 12/558,859, filed on Sep. 14, 2009, now Pat. No. 7,865,036, which is a continuation of application No. 11/282,955, filed on Nov. 18, 2005, now Pat. No. 7,599,577.

(51) Int. Cl.
    *G06T 5/001*    (2006.01)
(52) U.S. Cl.
    USPC .......................... 382/167; 382/103; 382/117
(58) Field of Classification Search .................. 382/103, 382/117, 164, 165, 167, 275; 345/589, 593; 358/3.26, 1.1; 715/243; 348/241, 453; 707/796, 707/915

See application file for complete search history.

(56) References Cited

U.S. PATENT DOCUMENTS 5,231,674 A    7/1993    Cleveland et al.
5,649,238 A    7/1997    Wakabayashi et al.
(Continued)

FOREIGN PATENT DOCUMENTS

EP    1 199 672 A2    4/2002
EP    1 528 509 A2    5/2005
(Continued)

OTHER PUBLICATIONS

Vachier et al., Valuation of image extrema using alternating filters by reconstruction, Proceedings of the SPIE—The International Society for Optical Engineering, vol. 2568, 1995, pp. 94-103.

(Continued)

*Primary Examiner* — Anh Do
(74) *Attorney, Agent, or Firm* — Andrew V. Smith

(57) ABSTRACT

A method for digital image eye artifact detection and correction include identifying one or more candidate red-eye defect regions in an acquired image. For one or more candidate red-eye regions, a seed pixels and/or a region of pixels having a high intensity value in the vicinity of the candidate red-eye region is identified. The shape, roundness or other eye-related characteristic of a combined hybrid region including the candidate red-eye region and the region of high intensity pixels is analyzed. Based on the analysis of the eye-related characteristic of the combined hybrid region, it is determined whether to apply flash artifact correction, including red eye correction of the candidate red-eye region and/or correction of the region of high intensity pixels.

33 Claims, 2 Drawing Sheets

U.S. PATENT DOCUMENTS

| | | | |
|---|---|---|---|
| 5,678,073 A | 10/1997 | Stephenson, III et al. | |
| 5,708,866 A | 1/1998 | Leonard | |
| 6,125,213 A | 9/2000 | Morimoto | |
| 6,407,777 B1 | 6/2002 | DeLuca | |
| 6,809,840 B1 | 10/2004 | Yu et al. | |
| 6,816,619 B2 | 11/2004 | Tlaskal et al. | |
| 6,873,743 B2 | 3/2005 | Steinberg | |
| 6,980,691 B2 | 12/2005 | Nesterov et al. | |
| 7,027,643 B2 | 4/2006 | Comaniciu et al. | |
| 7,042,505 B1 | 5/2006 | DeLuca | |
| 7,130,453 B2 | 10/2006 | Kondo et al. | |
| 7,403,654 B2 | 7/2008 | Wu et al. | |
| 7,474,341 B2 | 1/2009 | DeLuca et al. | |
| 7,567,707 B2 | 7/2009 | Willamowski et al. | |
| 7,574,069 B2 | 8/2009 | Setlur et al. | |
| 7,593,603 B1 | 9/2009 | Wilensky | |
| 7,613,332 B2 | 11/2009 | Enomoto et al. | |
| 7,619,665 B1 | 11/2009 | DeLuca et al. | |
| 7,630,006 B2 | 12/2009 | DeLuca et al. | |
| 7,657,060 B2 | 2/2010 | Cohen et al. | |
| 7,702,149 B2 | 4/2010 | Ohkubo et al. | |
| 7,747,071 B2 | 6/2010 | Yen et al. | |
| 7,847,839 B2 * | 12/2010 | DeLuca et al. | 348/241 |
| 7,847,840 B2 * | 12/2010 | DeLuca et al. | 348/241 |
| 7,903,870 B1 | 3/2011 | Budagavi | |
| 7,912,245 B2 | 3/2011 | Steinberg et al. | |
| 7,925,060 B2 | 4/2011 | Norita et al. | |
| 7,973,853 B2 | 7/2011 | Ojima et al. | |
| 8,130,309 B2 | 3/2012 | Wada | |
| 8,160,308 B2 | 4/2012 | Corcoran et al. | |
| 8,169,507 B2 | 5/2012 | Odaka | |
| 2001/0028981 A1 | 10/2001 | Okada et al. | |
| 2002/0089514 A1 | 7/2002 | Kitahara et al. | |
| 2002/0150292 A1 | 10/2002 | O'Callaghan | |
| 2003/0039402 A1 | 2/2003 | Robins et al. | |
| 2003/0053664 A1 | 3/2003 | Pavlidis et al. | |
| 2003/0071908 A1 | 4/2003 | Sannoh et al. | |
| 2003/0086134 A1 | 5/2003 | Enomoto | |
| 2003/0086164 A1 | 5/2003 | Abe | |
| 2003/0161506 A1 | 8/2003 | Velazquez et al. | |
| 2004/0041924 A1 | 3/2004 | White et al. | |
| 2004/0109614 A1 | 6/2004 | Enomoto et al. | |
| 2006/0072815 A1 | 4/2006 | Wu et al. | |
| 2006/0204052 A1 | 9/2006 | Yokouchi | |
| 2006/0280361 A1 | 12/2006 | Umeda | |
| 2006/0280375 A1 | 12/2006 | Dalton et al. | |
| 2007/0098260 A1 | 5/2007 | Yen et al. | |
| 2007/0150106 A1 | 6/2007 | Hashimoto et al. | |
| 2007/0195191 A1 | 8/2007 | Ide et al. | |
| 2007/0263928 A1 | 11/2007 | Akahori | |
| 2008/0112599 A1 | 5/2008 | Capata et al. | |
| 2008/0219518 A1 | 9/2008 | Steinberg et al. | |
| 2009/0022421 A1 | 1/2009 | Uyttendaele et al. | |
| 2009/0041309 A1 | 2/2009 | Kim et al. | |
| 2010/0034432 A1 | 2/2010 | Ono et al. | |
| 2010/0053367 A1 | 3/2010 | Nanu et al. | |
| 2010/0053368 A1 | 3/2010 | Nanu et al. | |
| 2011/0102643 A1 | 5/2011 | Nanu et al. | |
| 2011/0222730 A1 | 9/2011 | Steinberg et al. | |

FOREIGN PATENT DOCUMENTS

| | | |
|---|---|---|
| EP | 2 227 002 A2 | 9/2008 |
| EP | 2227002 A2 | 9/2010 |
| EP | 2 165 523 B1 | 4/2011 |
| EP | 2165523 B1 | 4/2011 |
| GB | 2379819 A | 9/2001 |
| JP | 3205989 A2 | 9/1991 |
| JP | 7281285 A2 | 10/1995 |
| JP | 10233929 A | 9/1998 |
| JP | 11175699 A | 7/1999 |
| JP | 411284874 A | 10/1999 |
| JP | 2000125320 A | 4/2000 |
| JP | 2003179807 A | 6/2003 |
| JP | 2006285956 A | 10/2006 |
| WO | WO 03/019473 A1 | 3/2003 |
| WO | WO 03/071484 A1 | 8/2003 |
| WO | 2005/015896 A1 | 2/2005 |
| WO | WO 2005/015896 A1 | 2/2005 |
| WO | WO 2005/076217 A2 | 8/2005 |
| WO | WO 2005/076217 A9 | 10/2005 |
| WO | WO 2005/076217 A3 | 4/2006 |
| WO | WO 2007/057063 A1 | 5/2007 |
| WO | WO 2008/109708 A1 | 9/2008 |
| WO | WO 2010/017953 A1 | 2/2010 |
| WO | WO 2010/025908 A1 | 3/2010 |

OTHER PUBLICATIONS

Yizong Cheng, Mean Shift, Mode Seeking, and Clustering, IEEE Transactions on Pattern Analysis and Machine Intelligence, vol. 17, No. 8, Aug. 1995, pp. 790-799.

EPO Communication pursuant to Article 94(3) EPC, for European application No. 08 846 475.5, dated Aug. 9, 2011, 4 pages.

Patent Abstracts of Japan, for Publication No. 2004-242141. Date of publication of application: Aug. 24, 2004, Application No. 2003-030541, Color Defective Area Correction Method, Color Defective Area Correction Processing Program, and Image Processing Apparatus.

Patent Abstracts of Japan, for Publication No. 2005-196385. Date of publication of application: Jul. 21, 2005, Application No. 2004-001007. Image Processing Apparatus, Image Processing Method and Digital Camera.

Non-final Rejection, dated Jan. 26, 2012, for U.S. Appl. No. 12/551,282, filed Aug. 31, 2009.

Non-final Rejection, dated Jan. 5, 2012, for U.S. Appl. No. 12/551,335, filed Aug. 31, 2009.

Non-Final Rejection, datd May 3, 2012, for U.S. Appl. No. 12/957,633, filed Dec. 1, 2010.

Non-Final Rejection, dated May 18, 2012, for U.S. Appl. No. 12/958,130, filed Dec. 1, 2010.

Non-Final Rejection, dated May 3, 2012, for U.S. Appl. No. 12/957,594, filed Dec. 1, 2010.

Notice of Allowance, dated Jun. 5, 2012, for U.S. Appl. No. 13/026,303, filed Feb. 14, 2011.

Notice of Allowance, dated May 1, 2012, for U.S. Appl. No. 12/815,396, filed Jun. 14, 2010.

Patent Abstracts of Japan, publication No. 05-019382, publication date: Jan. 29, 2003, Photographic Print Red-Eye Effect Correcting Method and Pictorial Hard Copying Device.

Patent Abstracts of Japan, publication No. 05-224271, publication date: Sep. 3, 1993, Image Processor.

Patent Abstracts of Japan, publication No. 2003-163861, publication date: Jun. 6, 2006, System and Method for Deciding When to Correct Image-Specific Defects Based on Camera, Scene, Display and Demographic Data.

Patent Abstracts of Japan, publication No. 2003-209683, publication date: Jul. 25, 2003, Image Processing Equipment and Image Processing Method.

Patent Abstracts of Japan, publication No. 2003-283849, publication date: Oct. 3, 2003, Method for Detecting and Correcting Red Eye.

Patent Abstracts of Japan, publication No. 11-175699, publication date: Jul. 2, 1999, Picture Processor.

Patent Abstracts of Japan, publication No. 02-064532, publication date: Mar. 5, 1990, Photographing Information Recordable Camera, and Information Outputting Device for Visualizing Object Information.

Patent Abstracts of Japan, publication No. 2003-109008, publication date: Apr. 11, 2003, Method for Automatic Detection of Red-Eye Defect in Photographic Image Data.

English Language Translation of JP 411284874 A. Document-identifier: JP 11284874 A. 2 Pages.

Gaubatz M., Ulichney R., Automatic red-eye detection and correction, International Conference on Image Processing (ICIP), (Sep. 22, 2002-Sep. 25, 2002), vol. 1,pp. 804-807, XP 010607446.

Smolka B., Czubin K., Hardeberg J. Y., Plataniotis K. N., Szczepanski M., Wojciechowski K., Towards automatic redeye effect removal, Pattern Recognition Letters, 20030701, vol. 24, Nr:11, pp. 1767-1785 Publication info: XP 004416063, Elsevier, Amsterdam, NL EC.

EPO Extended European Search Report, for European application No. 10164430.0, dated Sep. 6, 2010, including the extended European search report, pursuant to Rule 62 EPC, the European search report (R. 61 EPC) or the partial European search report/declaration of no search (R. 63 EPC) and the European search opinion, 8 pages.
Corinne Vachier, Luc Vincent, Valuation of Image Extrema Using Alternating Filters by Reconstruction, Proceedings of the SPIE—The International Society for Optical Engineering, 1995, vol. 2568, pp. 94-103.
EPO Communication pursuant to Article 94(3) EPC, for European patent application No. 05707215.9, report dated Sep. 14, 2010, 11 pages.
EPO Communication under Rule 71(3) EPC, for European patent application No. 09706058.6, report dated Oct. 4, 2010, 6 pages.
PCT Notification of Transmittal of the International Search Report and the Written Opinion of the International Searching Authority, or the Declaration, for PCT Application No. PCT/US2008/055964, dated Jul. 30, 2008, 8 pages.
PCT Written Opinion of the International Searching Authority, for PCT Application No. PCT/US2008/055964, dated Jul. 24, 2008, 5 pages.
PCT International Preliminary Report on Patentability, for PCT Application No. PCT/US2008/055964, dated Sep. 8, 2009, 6 pages.
Cuiping Zhang and Fernand S. Cohen, Component-Based Active Appearance Models for Face Modelling, D. Zhang and A.K. Jain (Eds.): ICB 2006, LNCS 3832, pp. 206-212, 2005, Springer-Verlag Berlin Heidelberg 2005.
Fundus Photograph Reading Center—Modified 3-Standard Field Color Fundus Photography and Fluorescein Angiography Procedure, Retrieved from the Internet on Oct. 19, 2011, URL: http://eyephoto.ophth.wisc.edu/Photography/Protocols/mod3-ver1.4.html, 3 pages.
Anatomy of the Eye, Retrieved from the Internet on Oct. 19, 2011, URL: http://www.stlukeseye.com/anatomy, 3 pages.
Fovea centralis, Retrieved from the Internet on Oct. 19, 2011, URL:http://en.wikipedia.org/wiki/Fovea, 4 pages.
Non-Final Office Action mailed Apr. 28, 2011, for U.S. Appl. No. 11/936,085, filed Nov. 7, 2007.
Non-Final Office Action mailed Apr. 28, 2011, for U.S. Appl. No. 11/937,377, filed Nov. 8, 2007.
Non-Final Office Action mailed Mar. 31, 2011, for U.S. Appl. No. 12/551,312, filed Aug. 31, 2009.
Non-Final Office Action mailed May 2, 2011, for U.S. Appl. No. 12/824,214, filed Jun. 27, 2010.
Notice of Allowance mailed Feb. 4, 2011, for U.S. Appl. No. 12/611,387, filed Nov. 3, 2009.
Notice of Allowance mailed Mar. 3, 2011, for U.S. Appl. No. 12/543,405, filed Aug. 18, 2009.
Final Office Action mailed Feb. 16, 2011, for U.S. Appl. No. 12/543,405, filed Aug. 18, 2009.
Final Office Action mailed Jan. 5, 2011, for U.S. Appl. No. 12/611,387, filed Nov. 3, 2009.
Notice of Allowance mailed May 12, 2011, for U.S. Appl. No. 12/043,025, filed Mar. 5, 2008.
Final Office Action mailed Feb. 2, 2011, for U.S. Appl. No. 12/613,457, filed Nov. 5, 2009.
Notice of Allowance mailed Mar. 17, 2011, for U.S. Appl. No. 12/042,335, filed Mar. 5, 2008.
Patent Abstracts of Japan, for Publication No. JP2002-247596, published Aug. 30, 2002, (Appl. No. 2001-044807), Program for Specifying Red Eye Area in Image, Image Processor and Recording Medium, 1 Page.
Agrawal A. et al., "Removing photography artifacts using gradient projection and flash-exposure sampling" ACM Transactions on Graphics , 2005, pp. 828-835.
Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Non-Final Office Action mailed Aug. 30, 2010, for U.S. Appl. No. 11/841,855, filed Aug. 20, 2007.
Non-Final Office Action mailed Aug. 5, 2010, for U.S. Appl. No. 11/462,035, filed Aug. 2, 2006.
Non-Final Office Action mailed May 3, 2010, for U.S. Appl. No. 12/187,763, filed Aug. 7, 2008.
Non-Final Office Action mailed May 4, 2010, for U.S. Appl. No. 12/192,335, filed Aug. 15, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Nov. 18, 2009, for U.S. Appl. No. 11/282,954, filed Nov. 18, 2005.
Notice of Allowance mailed Oct. 15, 2010, for U.S. Appl. No. 11/554,539, filed Oct. 30, 2006.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
Tatsutoshi Kitajima (JP04-192681 English Translation; Electronic Camera, Jul. 10, 1992).

* cited by examiner

METHOD AND APPARATUS OF CORRECTING HYBRID FLASH ARTIFACTS IN DIGITAL IMAGES

CROSS-REFERENCE TO RELATED APPLICATIONS

This application is a Continuation of U.S. patent application Ser. No. 12/960,487, filed Dec. 4, 2010, now U.S. Pat. No. 8,126,265; which is a Continuation of U.S. patent application Ser. No. 12/558,859, filed on Sep. 14, 2009, now U.S. Pat. No. 7,865,036; which is a Continuation of U.S. patent application Ser. No. 11/282,955, filed on Nov. 18, 2005, now U.S. Pat. No. 7,599,577, entitled, "Method and Apparatus of Correcting Hybrid Flash Artifacts in Digital Images."

BACKGROUND

1. Field of the Invention

The present invention relates to digital image correction, and particularly to correction of eye artifacts due to flash exposure.

2. Description of the Related Art

U.S. Pat. No. 6,873,743 to Steinberg, which is hereby incorporated by reference, discloses an automatic, red-eye detection and correction system for digital images including a red-eye detector module that determines without user intervention if a red-eye defect exists. If a defect is located in an image the portion of the image surrounding the defect is passed to a correction module that de-saturates the red components of the defect while preserving the other color characteristics of the defect region.

WO03/071484, Pixology, discloses a method of detecting red-eye features in a digital image comprising identifying highlight i.e. glint regions of the image having pixels with a substantially red hue and higher saturation and lightness values than pixels in the regions therearound. In addition, pupil regions comprising two saturation peaks either side of a saturation trough may be identified. It is then determined whether each highlight or pupil region corresponds to part of a red-eye feature on the basis of further selection criteria, which may include determining whether there is an isolated, substantially circular area of correctable pixels around a reference pixel. Correction of red-eye features involves reducing the lightness and/or saturation of some or all of the pixels in the red-eye feature.

In many cases, the eye-artifact that is caused by the use of flash is more complex than a mere combination of red color and a highlight glint. Such artifacts can take the form of a complex pattern of hybrid portions that are red and other portions that are yellow, golden, white or a combination thereof. One example includes the case when the subject does not look directly at the camera when a flash photograph is taken. Light from the flash hits the eye-ball at an angle which may provoke reflections different than retro-reflection, that are white or golden color. Other cases include subjects that may be wearing contact lenses or subjects wearing eye glasses that diffract some portions of the light differently than others. In addition, the location of the flash relative to the lens, e.g. under the lens, may exacerbate a split discoloration of the eyes.

SUMMARY OF THE INVENTION

A technique is provided for digital image artifact correction as follows. A digital image is acquired. A candidate red-eye defect region is identified in the image. A region of high intensity pixels is identified which has at least a threshold intensity value in a vicinity of said candidate red-eye region. An eye-related characteristic of a combined hybrid region is analyzed. The combined hybrid region includes the candidate red-eye region and the region of high intensity pixels. The combined hybrid region is identified as a flash artifact region based on the analyzing of the eye-related characteristic. Flash artifact correction is applied to the flash artifact region.

The flash artifact correction may include red-eye correction of the candidate red-eye region. The flash artifact correction may also include correction of the region of high intensity pixels.

A bounding box may be defined around the candidate red-eye defect region. The identifying of the region of high intensity pixels may comprise identifying a seed high intensity pixel by locating said seed high intensity pixel within said bounding box. The seed pixel may have a yellowness above a pre-determined threshold and a redness below a pre-determined threshold. The region of high intensity pixels may be defined around the seed pixel.

The analyzing may include calculating a difference in roundness between the candidate red-eye region and the combined region. The red-eye correction may be applied when the roundness of the combined hybrid region is greater than a threshold value.

The method may include determining to apply red-eye correction when a roundness of the combined hybrid region is greater than a roundness of the candidate red-eye region by a threshold amount.

The method may include determining to not apply correction when the region of high intensity pixels includes greater than a threshold area. The area may be determined as a relative function to the size of said bounding box.

The method may include determining a yellowness and a non-pinkness of the region of high intensity pixels. The acquired image may be in LAB color space, and the method may include measuring an average b value of the region of high intensity pixels and determining a difference between an average a value and the average b value of the region of high intensity pixels.

The analyzing may include analyzing the combined hybrid region for the presence of a glint, and responsive to detecting a glint, determining to not correct the region of high intensity pixels responsive to the presence of glint.

The method may include correcting the region of high intensity pixels by selecting one or more pixel values from a corrected red-eye region and employing the pixel values to correct the region of high intensity pixels. The selected pixel values may be taken from pixels having L and b values falling within a median for the corrected red-eye region.

The method may include determining to not apply correction when an average b value of the region of high intensity pixels exceeds a relatively low threshold or if a difference between average a and b values is lower than a pre-determined threshold.

The method may include converting the acquired image to one of RGB, YCC or Lab color space formats, or combinations thereof.

The analyzing of the acquired image may be performed in Luminance chrominance color space and the region of high intensity pixels may have a luminance value greater than a luminance threshold, and blue-yellow chrominance values greater than a chrominance threshold and a red-green value less than a red-green threshold.

The method may include filtering the red-eye candidate regions to confirm or reject said regions as red-eye defect regions, and selecting a subset of the rejected red-eye candidate regions.

The method may be implemented within a digital image acquisition device. The method may be implemented as part of an image acquisition process. The method may be implemented as part of a playback option in the digital image acquisition device.

The method may be implemented to run as a background process in a digital image acquisition device. The method may be implemented within a general purpose computing device and wherein the acquiring may include receiving the digital image from a digital image acquisition device.

The candidate red-eye region and/or the region of high intensity pixels may be corrected. The region of high intensity pixels may be corrected after the red-eye candidate region. The correcting of the region of high intensity pixels may utilize corrected pixel values based on the candidate red-eye region. Results of correcting the candidate red-eye region and the region of high intensity pixels may be combined in such a manner as to obfuscate a seam between the regions. The method may include smoothing a seam region between the candidate red-eye region and the region of high intensity pixels.

The eye-related characteristic may include shape, roundness, and/or relative pupil size.

A further method is provided for digital image artifact correction. A digital image is acquired. A candidate red-eye defect region is identified in the image. A seed pixel is identified which has a high intensity value in the vicinity of the candidate red-eye region. An eye-related characteristic of a combined hybrid region is analyzed. The combined hybrid region includes the candidate red-eye region and the seed pixel. The combined hybrid region is identified as a flash artifact region based on the analyzing of the eye-related characteristic. Flash artifact correction is applied to the flash artifact region.

The flash artifact correction may include red-eye correction of the candidate red-eye region. The flash artifact correction may also include correction of a second region that includes the seed pixel.

The seed pixel may have a yellowness above a pre-determined threshold and a redness below a pre-determined threshold.

The method may include filtering the red-eye candidate regions to confirm or reject the regions as red-eye defect regions, and selecting a subset of the rejected red-eye candidate regions.

The method may be implemented within a digital image acquisition device. The method may be implemented as part of an image acquisition process. The method may be implemented as part of a playback option in the digital image acquisition device.

The method may be implemented to run as a background process in a digital image acquisition device. The method may be implemented within a general purpose computing device, and the acquiring may include receiving the digital image from a digital image acquisition device. The analyzing may include checking whether an average b value exceeds a relatively low threshold. The analyzing may include checking whether a difference between an average a value and the average b value is lower than a given threshold.

BRIEF DESCRIPTION OF THE DRAWINGS

Embodiments of the invention will now be described by way of example with reference to the accompanying drawings, in which.

DETAILED DESCRIPTION OF THE PREFERRED EMBODIMENTS

The preferred embodiments provide improved methods for detecting defects in subjects' eyes as well as methods for correcting such defects.

A preferred embodiment may operate by examining a candidate red eye region, looking in its neighborhood or vicinity for a possible yellow, white and/or golden patch belonging to the same eye, and, if any, under certain conditions correcting one or both of the red-eye or golden patch.

Using a technique in accordance with a preferred embodiment, the quality and acceptability of automatic eye correction can be increased for half red-half white/golden defects.

Implementations of the preferred embodiments can take advantage of the red part of the eye defect being detected by one automatic red-eye detection processing method, perhaps utilizing a conventional technique or a new technique, so the detection of the non-red regions can be applied as a pre-correction stage, and so that this method may take full advantage of existing or new detection methods. The correction parts of such red-eye processing may be altered to implement a technique in accordance with a preferred embodiment, while non correction parts preferably are not altered.

A technique in accordance with a preferred embodiment may provide a qualitative improvement in image correction with relatively little processing overhead making it readily implemented in cameras that may have limited processing capability and/or without unduly effecting the camera click-to-click interval.

It will be seen that pixels belonging to a red-eye defect may be corrected by reducing the red value of the pixel. As an example, image information may be available in Luminance-Chrominance space such as L*a*b* color space. This may involve reducing the L* and a* value of a pixel to a suitable level. In manu cases, reduction of the a* value may automatically restore the chrominance of the eye thus restoring a true value of the iris.

However, for white/golden pixels of a half red-half white/golden eye defect, the L and possibly b characteristics of the pixel may also be either saturated and/or distorted. This means that unlike red eye defects, in these cases the original image information may be partially or even totally lost. The correction may be performed by reducing the overall L* value as well as reduction of the a* and b*. However, because l* may be very high, the chrominance may be very low, thus there may not be significant color information remaining In an additional preferred embodiment, correction of the white/golden portion of the defect involves reconstructing the eye, as opposed to the restoration described above from information from the corrected red eye portion of the defect.

Figure 3:
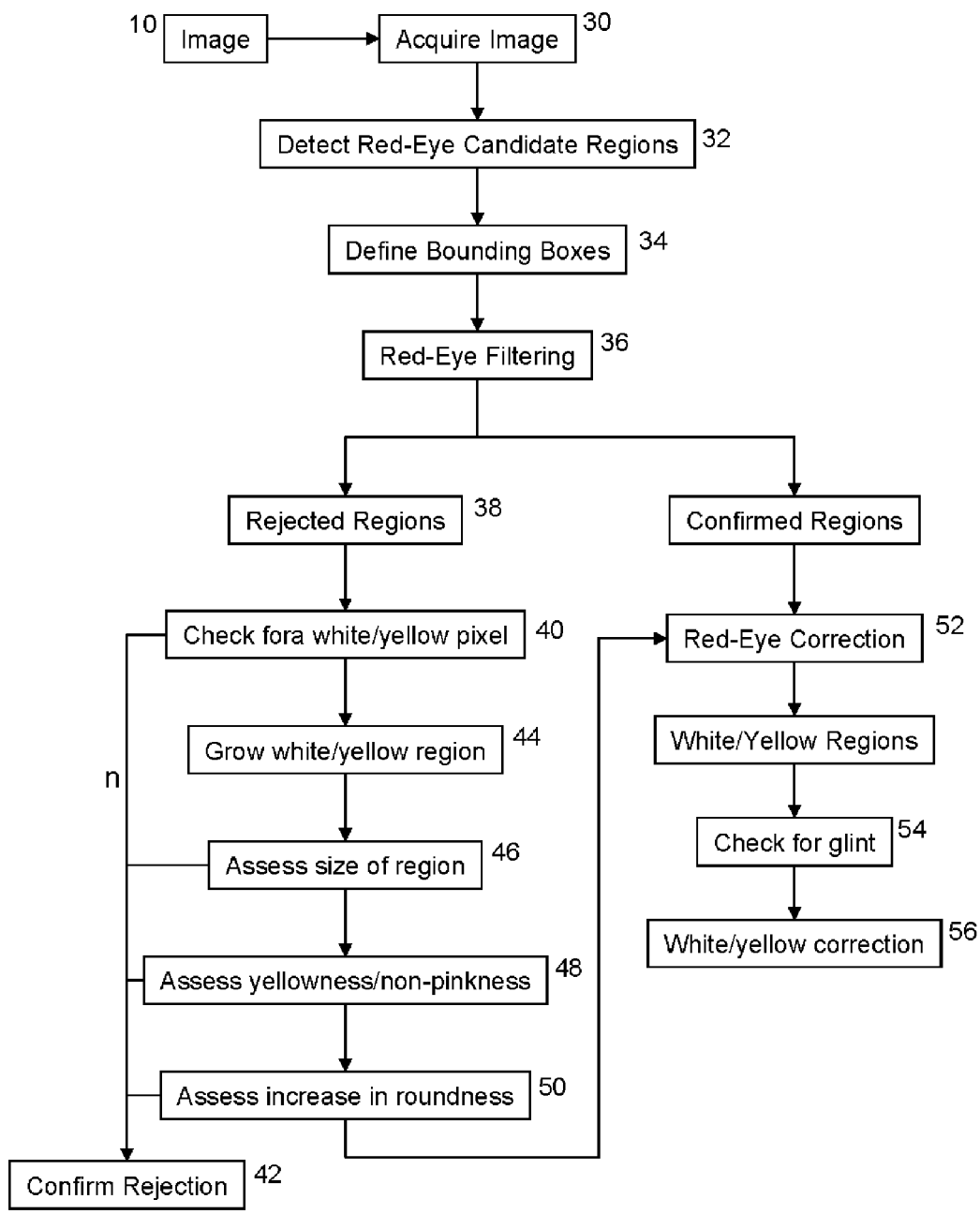
FIG. 3 illustrates a flow diagram of an embodiment of image correction software according to the present invention.

Referring now to FIG. 3, a digital image 10 may be acquired 30 in an otherwise conventional manner and/or utilizing some innovative technique. Where the embodiment is implemented in a device separate from a device such as a camera or scanner on which the image was originally acquired, the image may be acquired through file transfer by another suitable means including wired or wireless peer-to-peer or network transfer. Otherwise the image correction process described below, if suitably speed optimized, can either be implemented within the image acquisition chain of the image acquisition device for displaying a corrected image to a user before the user chooses to save and/or acquire a subsequent image; or alternatively, the image correction process can be analysis optimized to operate in the background on the image acquisition device on images which have been stored previously.

Figure 1:
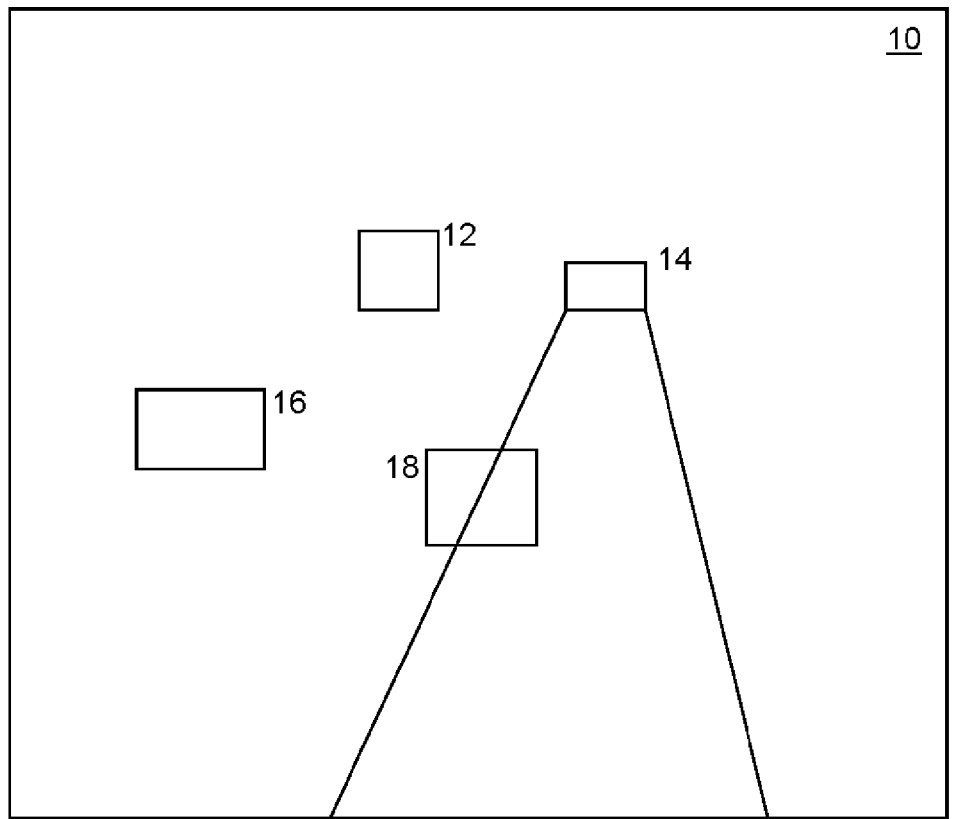
FIG. 1 illustrates an image in which several defect candidate regions have been identified and surrounded by bounding boxes.

Next, during red-eye detection 32, red-pixels 20 are identified and subsequently grouped into regions 22 comprising a plurality of contiguous (or generally contiguous) pixels (see, e.g., FIG. 2). These regions can be associated 34 with larger bounding box regions 12,14,16,18 (see, e.g., FIG. 1). The candidate regions contained within these bounding boxes are then passed through a set of filters 36 to determine whether the regions are in fact red-eye defects or not. Examples of such falsing filters are disclosed in U.S. Pat. No. 6,873,743.

Figure 2:
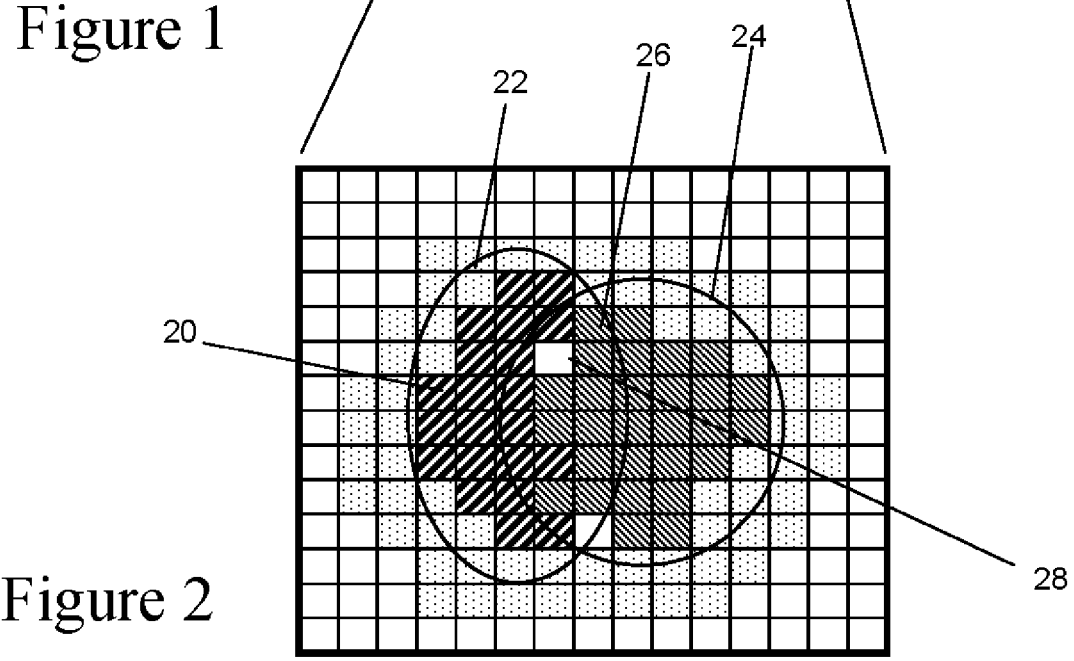
FIG. 2 shows in more detail a candidate region exhibiting a half-red half-white/golden defect.

One possible reason a filtering process might reject a candidate region, such as a region of red-pixels 20 as illustrated at FIG. 2, is that it lacks the roundness expected of a typical red-eye defect. Such regions as well as regions failed for other suitable reasons may be preferably passed as rejected regions 38 for further processing to determine if they include a half red-half white/golden eye defect—and if so for the defect to be corrected accordingly. Much of the operation of this processing can be performed in parallel with other red-eye processing (in for example a multi-processing environment) or indeed processing for each rejected region could be carried out to some extent in parallel.

Processing in accordance with an exemplary embodiment which may be involved in checking for half red-half white/golden eye defects is outlined in more detail as follows:

1. The bounding box 12-18 of an already detected red part of the eye artifact is searched 40 for a point, say 26 (see FIG. 2) having:
   a. High intensity (I>threshold)
   b. High yellowness (b>threshold)
   c. Low redness (a<threshold)
   In this example, it is assumed that the image information for a region is available in Lab color space, although another embodiment could equally be implemented for image information in other formats such as RGB, YCC or indeed bitmap format.
   If such a point does not exist, then STOP (i.e., the decision is taken that no white/golden patch exists in the vicinity of the red area) and confirm that the region is to be rejected 42.

2. Starting from a point detected in Step 40, grow 44 a region 24 (see FIG. 2) based on luminance information, for example, if luminance is greater than a threshold, a point is added to the white/golden region 24. If the region 24 exceeds a predefined maximum allowable size, step 46, then STOP and confirm that the region is to be rejected 42. The maximum allowable size can be determined from a ratio of the bounding box area vis-á-vis the overall area of the red 22 and white/golden region 24.

3. Yellowness and non-pinkness of the white region are then assessed 48 by checking that average b value exceeds a relatively low threshold, and the difference between average "a" and average "b" is lower than a given threshold. If at least one test fails, then STOP and confirm that the region is to be rejected 42.

4. In this embodiment, the increase of roundness of the combination of initial red 22 and detected white/golden regions 24 from the original red region 22 is checked 50. Thus, the roundness of the union of the red and white/golden regions is computed and compared with that of the red region 22. If roundness is less than a threshold value or decreased or not increased sufficiently by "adding" the white/golden region 24 to the red one 22, then STOP and reject the region 42. Roundness of a region is preferably computed using the formula $$\text{Roundness} = \frac{\text{Perimeter}^2}{4\pi \cdot \text{Area}}$$

Prior to assessing roundness, a hole filling procedure is preferably applied to each region 22,24 to include for example pixel 28 within the union.

5. If the region passes one or more and preferably all of the above tests, it is added to the list of confirmed red-eye regions. At this point, the red part of the eye defect can be corrected 52 in any of various manners, for example, by reducing the a value of pixels in Lab color space, while the pixels that were corrected are marked to be used in further processing.

6. For white/golden regions that were added to the list of red-eye defect regions, further correction of the white/golden portion of the defect can be applied, after some further checks. One such check is to detect glint 54. In RGB space, glint candidates are selected as high luminance pixels (for example, min(R, G)>=220 and max(R, G)==255). If a very round (e.g, in one or both of aspect ratio and elongation), luminous, and desaturated region is found within the interior of the current "red ∪ white" region 22,24, its pixels may be removed from the "pixels-to-correct" list. The glint may be the entire high luminance region but in most cases only a small part of the high luminance region will satisfy the criteria for glint pixels.

7. Where a glint is not detected or is small relative to the size of the white/golden region, the non-red eye artifact pixels 24 can be corrected 56 preferably taking color information from red pixels 22 which where already corrected at step 52, if such information after the correction exists. Alternatively, the correction can be done by reduction of the Luminance value. In the preferred embodiment, color information is derived from a selection of ex-red pixels with L and b values which lie in the median for that region (between the 30% and 70% points on a cumulative histogram for L and b). These color samples (from the already corrected red part of the eye) are used to create the same texture on both the red and non-red defect parts of the eye. It should be noted that the L and b histograms may be generally available from preprocessing steps, for example, those for determining various thresholds, and won't necessarily have changed during correction as the red correction may just involve reducing the a value of a pixel. It is possible that the correction of the red-eye region and the one for the high intensity region may show an unpleasant seam between the regions. In an alternative embodiment, the corrected region will be smoothed in such a manner that the seams between the two regions if exist, will be eliminated.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A digital image acquisition device comprising a lens, an image sensor, a processor and a computer readable medium having computer readable code embodied therein for programming the processor to correct a digital image, wherein the device is configured to:
acquire a digital image;
identify a candidate eye defect region in said image, including a region of high intensity pixels having a threshold intensity value within a sub-region comprising a pupil region of the image;
identify an iris region around said pupil region including a chrominance value;
analyze an eye-related characteristic of the sub-region that comprises a region of high intensity pixels;
identify said sub-region as a flash artifact region based on said analyzing of said eye-related characteristic;
apply flash artifact correction to said flash artifact region; and
determine and correct the chrominance value of the iris region.

2. The digital image acquisition device of claim 1, wherein the device is further configured to define a bounding box around said candidate eye defect region.

3. The digital image acquisition device of claim 1, wherein the device is further configured to convert said acquired image to at least one of RGB, YCC and Lb color space format.

4. The digital image acquisition device of claim 1, wherein said device is further configured to analyze said acquired image in Luminance chrominance color space and said image comprises a region of high intensity pixels having a luminance value greater than a luminance threshold, and blue-yellow chrominance values greater than a chrominance threshold and a red-green value less than a red-green threshold.

5. The digital image acquisition device of claim 1, the method further comprising:
filtering red-eye candidate regions to confirm or reject said regions as red-eye defect regions; and
selecting a subset of rejected red-eye candidate regions for analysis as hybrid regions.

6. The digital image acquisition device of claim 1, wherein said flash artifact correction includes red eye correction of said candidate red-eye region.

7. The digital image acquisition device of claim 6, wherein said flash artifact correction further comprises correction of a region of high intensity pixels.

8. The digital image acquisition device of claim 7, wherein the device is configured to correct said region of high intensity pixels using corrected pixel values based on said candidate red-eye region.

9. The digital image acquisition device of claim 7, wherein the device is configured to combine results of correcting said candidate red-eye region and said region of high intensity pixels in such a manner as to obfuscate a seam between the regions.

10. The digital image acquisition device of claim 7, wherein the device is configured to smooth a seam region between said candidate red-eye region and said region of high intensity pixels.

11. The digital image acquisition device of claim 1, wherein said eye-related characteristic comprises at least one of shape, roundness and pupil size.

12. A method of correcting a digital image, comprising:
acquiring a digital image, including capturing a digital image using the lens and
the image sensor or receiving a digital image captured by an optical system of another device, or combinations thereof;
identifying a candidate eye defect region in said image, including a region of high intensity pixels having a threshold intensity value within a sub-region comprising a pupil region of the image;
identifying an iris region around said pupil region including a chrominance value;
analyzing an eye-related characteristic of the sub-region that comprises said candidate eye defect region; and
identifying said sub-region as a flash artifact region based on said analyzing of said eye-related characteristic;
applying flash artifact correction to said flash artifact region; and
determining and correcting the chrominance value of the iris region.

13. The method of claim 12, further comprising defining a bounding box around said candidate eye defect region.

14. The method of claim 12, further comprising converting said acquired image to at least one of RGB, YCC and Lb color space format.

15. The method of claim 12, wherein said analyzing of said acquired image is performed in Luminance chrominance color space, and said image comprises a region of high intensity pixels having a luminance value greater than a luminance threshold, and blue-yellow chrominance values greater than a chrominance threshold and a red-green value less than a red-green threshold.

16. The method of claim 12, further comprising:
filtering red-eye candidate regions to confirm or reject said regions as red-eye defect regions; and
selecting a subset of rejected red-eye candidate regions for analysis as hybrid regions.

17. The method of claim 12, wherein said flash artifact correction includes red eye correction of said candidate red-eye region.

18. The method of claim 17, wherein said flash artifact correction further comprises correction of a said region of high intensity pixels.

19. The method of claim 18, wherein correcting said region of high intensity pixels comprises using corrected pixel values based on said candidate red-eye region.

20. The method of claim 18, wherein results of correcting said candidate red-eye region and said region of high intensity pixels are combined in such a manner as to obfuscate a seam between the regions.

21. The method of claim 18, further comprising smoothing a seam region between said candidate red-eye region and said region of high intensity pixels.

22. The method of claim 12, wherein said eye-related characteristic comprises at least one of shape, roundness and pupil size.

23. One or more non-transitory processor-readable media having code embedded therein for programming a processor to correct a digital image, wherein the code is configured to program the processor to:

identify a candidate eye defect region in a digital image, including a region of high intensity pixels having a threshold intensity value within a sub-region comprising a pupil region of the image;

identify an iris region around said pupil region including a chrominance value;

analyze an eye-related characteristic of the sub-region that comprises a region of high intensity pixels; and identify said sub-region as a flash artifact region based on said analyzing of said eye-related characteristic;

apply flash artifact correction to said flash artifact region; and determine and correct the chrominance value of the iris region.

24. The one or more processor-readable media of claim 23, wherein the code is configured to program the processor to define a bounding box around said candidate eye defect region.

25. The one or more processor-readable media of claim 23, wherein the code is configured to program the processor to convert said acquired image to at least one of RGB, YCC and Lb color space format.

26. The one or more processor-readable media of claim 23, wherein said code is further configured to program the processor to analyze said acquired image in Luminance chrominance color space, and said region of high intensity pixels has a luminance value greater than a luminance threshold, and blue-yellow chrominance values greater than a chrominance threshold and a red-green value less than a red-green threshold.

27. The one or more processor-readable media of claim 23, wherein the code is configured to program the processor to:
filter red-eye candidate regions to confirm or reject said regions as red-eye defect regions; and
select a subset of rejected red-eye candidate regions for analysis as hybrid regions.

28. The one or more processor-readable media of claim 23, wherein said flash artifact correction includes red eye correction of said candidate red-eye region.

29. The one or more processor-readable media of claim 28, wherein said flash artifact correction further comprises correction of said region of high intensity pixels.

30. The one or more processor-readable media of claim 28, wherein correcting said region of high intensity pixels comprises using corrected pixel values based on said candidate red-eye region.

31. The one or more processor-readable media of claim 28, wherein results of correcting said candidate red-eye region and said region of high intensity pixels are combined in such a manner as to obfuscate a seam between the regions.

32. The one or more processor-readable media of claim 28, further comprising smoothing a seam region between said candidate red-eye region and said region of high intensity pixels.

33. The one or more processor-readable media of claim 23, wherein said eye-related characteristic comprises at least one of shape, roundness and pupil size.

* * * * *